Sept. 26, 1950     O. C. SCARBERRY     2,523,595
KEY FOR THE REPAIR OF CRACKED METAL CASTINGS
Filed Jan. 29, 1947
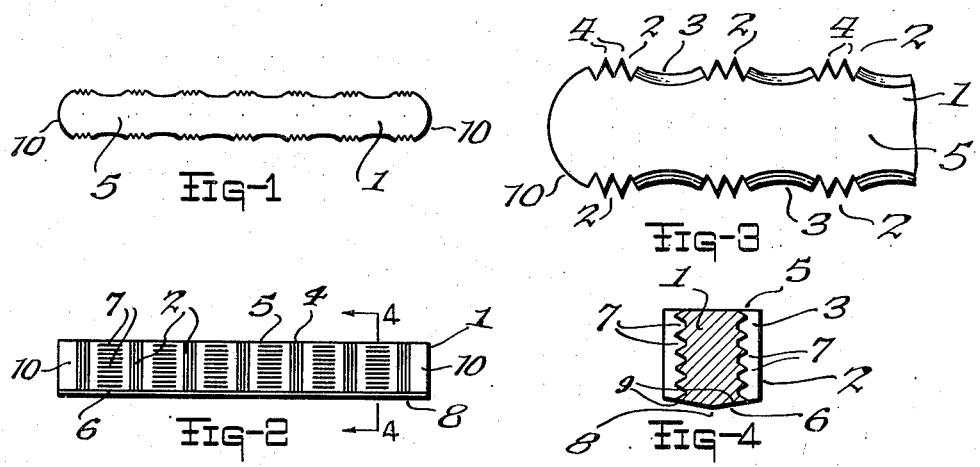
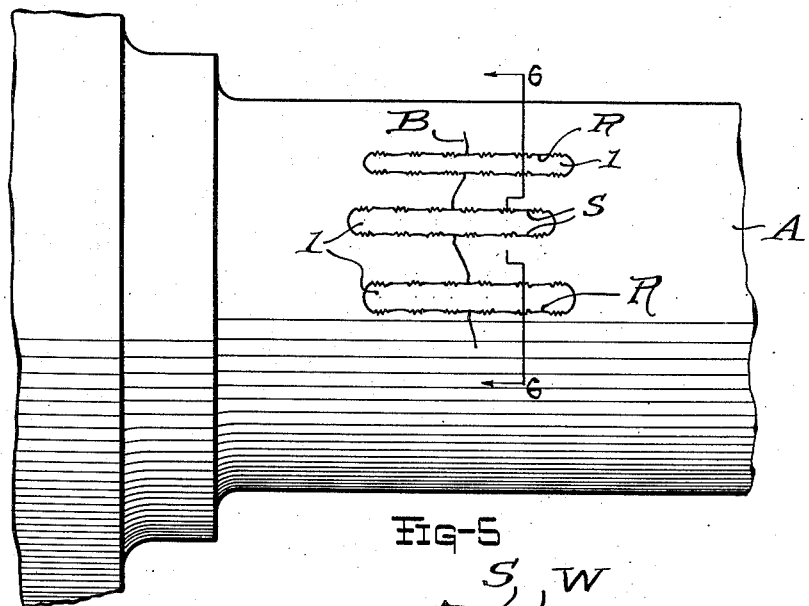
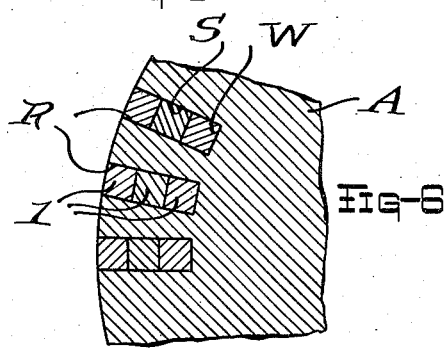
Inventor
Oscar C. Scarberry
By John R. Powers
Attorney Patented Sept. 26, 1950

2,523,595

UNITED STATES PATENT OFFICE 2,523,595

KEY FOR THE REPAIR OF CRACKED METAL CASTINGS

Oscar C. Scarberry, Ashland, Ohio

Application January 29, 1947, Serial No. 725,087

3 Claims. (Cl. 189—36)

The repair of cracked metal castings has for many years conformed to a practice illustrated generally in the patent to Scott, No. 2,195,741 of April 2, 1940. In this practice one or more continuous elongated recesses are formed athwart the crack and in an ideal symmetrical relation to it, the number of recesses and their mutual spacing depending on the lineal extent of the crack and the depths of the several recesses conforming to the depths of the crack in corresponding zones; and repair keys are fitted in the recesses, the recesses and repair keys constituting cooperating companion elements. The repair keys, as independent articles of manufacture, have long been made of rectangular cross-section and of standard dimensions as to width and depth whereas the depth of each recess, conforming to the depth of the corresponding zone of the crack, may be several times the depth of the individual repair key. In such cases repair keys, to the required number, are fitted in superposed relation in the recesses, the excess parts of the outermost repair keys being made flush, as by machining, with the surface of the casting to be repaired. The side walls of each recess and the lateral faces of the companion repair key or keys are of conformable interengaging "hill and dale" formation, the dimensions of each recess, as to length and width and in relation to the companion repair key or keys, as forced into it by hammering or otherwise, being such that the repair key or keys will have a press fit. The "hills" of each key have, as a matter of preference, been of convex surface curvature in the lineal direction of the key and are, in effect, locking lugs. The metal of the key is an alloy (Invar, 63.80% iron, 36% nickel, 0.20% carbon) such that its dimensions are not affected by heat and that, under the hammering operation, the alloy having suitable malleability, the key will be compressed with the result of an increase of its longitudinal and cross-sectional dimensions such as to assure of an originally good press fit in the recesses and to effect an efficient compression of the parent metal (the casting to be repaired) adjacent the walls of the recesses.

In a large percentage of cases the repaired casting is used in a machine or environment such that it is continuously subject to steady vibrations within a wide range of frequency; and it has been found that these vibrations, after a relatively short period of use of the repaired casting, cause the loosening of the repair keys relative to the companion recesses in which they are fitted, with the result that the repair keys are dislodged and the repaired casting rendered useless. In such cases further repairs are not satisfactory because, requiring the formation of additional recesses, they will result in the undue weakening of the part and will be of extremely temporary nature. I have found that the cause of the loosening of the keys when the casting is subject to steady vibrations is the tensions elsewhere in the castings (resulting from the vibrations) which adversely affect the compression areas at or adjacent the walls of the recesses. Thereby over a period of use, relatively short, the beneficial effects of these compression areas are nullified with the result of the loosening of the keys and their dislodgment from the recesses.

The object of the invention is to overcome this objection and to provide highly efficient bonds between the keys and the casting which will be uniformly effective substantially throughout the life of the casting.

In the accomplishment of this object, I utilize the increased strength of cast iron under compression (such strength being four to five times greater than its strength under tension) and I provide a key which, retaining the hill and dale form of the prior art, is distinguishingly characterized by structural features which increase the compression effects upon the casting, the extent of the compression areas of the casting and the pounds of pressure per square inch upon the parent metal (the casting), which provides an effective and permanent interlocking relation between the keys and the recesses whereby the keys are self-retaining, and in which tensions incident to the compression fit of the keys in the recesses are set up in opposing relations whereby, in respect to the compression areas, their effects are neutralized and the compression areas retain substantially their original effectiveness throughout the life of the casting.

In the accompanying drawing:

Figure 1 is a plan view of a casting repair key in accordance with the invention.

Figure 2 is a side elevation thereof.

Figure 3 is a fragmentary plan view substantially enlarged and with the features of the invention shown on an exaggerated scale in order to promote clarity of illustration.

Figure 4 is a cross-section on line 4—4 of Figure 2, looking in the direction of the arrows, on the same enlarged scale as that of the plan view, Figure 3.

Figure 5 is an elevation of a cracked casting which has been repaired by a series of keys of the construction shown in the preceding figures.

Figure 6 is a partial cross-section upon the line 6—6 of Figure 5, looking in the direction of the arrows.

The key 1 has on its lateral faces projecting locking lugs 2 and recesses 3 between the adjacent lugs. According to the invention the lugs 2 are formed with a series of serrations 4 which terminate in relatively sharp edges and extend between the top and bottom faces 5 and 6 of the key. The base wall of each recess 3 is preferably formed with serrations 7 which extend at right angles to the serrations 4. The bottom face 6, instead of being flat as is the top face 5, is preferably of shallow angular formation, having a central longitudinal apex 8 and inclined portions 9 tapering to the apex 8 from the sides of the key.

The casting shown in the drawing is assumed to have a transverse crack B of irregular outline and of a depth such that keys in superimposed relation will be required for the repair, the number of keys in the recess depending on the depth of the crack in the corresponding zone. Of course, if the crack is shallow a single key may be sufficient. In the drawing the depth and length of the crack are assumed to be such that more than one key (a series) will be required in any zone and more than one series will be required over the length of the crack. By way of example three series, each of three keys are shown.

While the keys may be originally individually formed it is preferred to cut them on the job from an elongated bar having the key features above described, the keys being cut to suitable lengths in accordance with the nature of the repair and preferably having straight sides and rounded ends 10. In the repair of the part recesses R are cut into the part athwart the crack and preferably in symmetrical relation to it, the depths of these recesses being determined by the depths of the crack in corresponding zones and being such that the bases of the recesses are located inwardly of the inner limit of the crack. Where the part is of curved or cylindrical section, as in the example shown, the recesses are preferably cut to extend into the part substantially along radial lines. The recesses are so cut or finished as to have flat bottom walls W and side walls S which are straight in the direction between the outer ends of the recesses and the bases W.

The recesses conform in lineal outline to the hill and dale lineal outline of the keys, the resultant dwells and projections being, however, without serrations. The lineal dimensions of each recess conforms to the length of the corresponding key and the lateral dimensions conform to the varying widths of the key as measured between the apices of the corresponding serrations 4 and 7 at the opposite sides of the key. In order to provide for the ready insertion of the key the lineal and lateral dimensions of the recess are greater within very close limits of tolerance than the corresponding dimensions of the key, the initial spacing of the side and end walls of the recess from the corresponding faces of the key being of the order of .005 inch.

While the keys may be of any suitable dimensions as to width and depth it is preferred that they substantially conform in these respects to the prior art practice whereby they may be forced into the recesses by means of a standard hammering device.

The key, or the first key if more than one be required, is centered relatively to the recess R and forced by the hammering device into the recess until the apex 8 of its bottom face 6, engages the base W of the recess. The operation of the hammering device is then continued to a suitable extent whereby the key, its material having sufficient malleability for the purpose, will be compressed and thereby increased in longitudinal and lateral extent with the result of taking up the clearance between it and the side and end walls of the recess and acting with permanent compression effect upon the parent metal adjacent such side and end walls. This compression effect is enhanced, that is to say the degree of compression is increased, by the flattening of the shallowly wedge shaped bottom face 6. If more than one key be required the keys are successively forced into the recess R by the hammering device, the bottom face 6 of each successively introduced key engaging the top face 5 of the underlying key. The result of such engagement, the hammering operation being continued to a suitable extent, is the flattening of the bottom face 6 and the increase of the lateral spread of the adjacent key adjacent its top face 5 with the result of causing both keys to have enhanced compression effects upon the parent metal, that is to say to increase the degree of compression which both keys exercise upon the parent metal. As a result of the compression of the keys and the flattening of the bottom face 6, the keys at the completion of the hammering operation will have a substantially rectangular cross-section as is sufficiently indicated in Figure 6.

The continued hammering operation, as above described, so compresses the key that the increase of its lateral dimensions is such not only to take up the clearance between it and the adjacent walls of the recess but to cause the serrations 4 and 7 to penetrate the parent metal through their full extent and with compression effect, thereby to contribute to the enhance of the degree of compression and also to provide for an effective mechanical interlock of the key to the casting within the areas of the casting which are of increased strength by being under compression. Since the serrations 4 and 7 have a relationship of right angles the tensions incident to their penetration of the parent metal have an opposing relationship and thereby substantially neutralize one another. It follows that the compression areas of the parent metal are not substantially affected by tension stresses and the high efficiency of their cooperation with the keys remains substantially constant throughout the life of the casting.

As to the prior art practice, the dimensions of the keys, laterally and in depth, which have long been standard are quite satisfactory, that is to say these dimensions provide for keys of proper strength and which exercise originally good compression effects. The hammering devices have been designed to conform to standard key dimensions. While the present key may be of any dimensions within practical limits it preferably conforms substantially to the dimensions which have become standard. In such conformity in its locking lug portions it has a maximum width, measured between the apices of the corresponding serrations 4 on the opposite face of .240 inch, a spacing of nine-thirty-seconds of an inch between the centers of the locking lugs, and in its portions in which the recesses 3 are formed a maximum width of .194 inch and a straight line lineal extent of .287 inch; it has a depth of .249 at the sides and of .254 in the central plane which bisects the angle 9–8–9; and the serrations 4, as to their apices, conform to an arc of relatively short radius, preferably one-eighth of an inch, the maximum radial extent measured from the chord being .0225 inch. Whereas in the prior art keys the recesses between the locking lugs have flat bases it is preferred that these recesses, i. e. the recesses 3, have bases so concavely curved in the lineal direction of the key as to eliminate sharp corners and possible breaking stresses, the curvature being shallow and about a relatively long radius, preferably consistently with the foregoing lateral dimensions, a radius of the order of three inches.

While the number of serrations of each series, their angularity and the extent of their projection may be varied within practical limits I have found that with a key of the substantial dimensions above specified highly satisfactory results are obtained, and the objects of the invention fully served, by the provision of three immediately adjoining parallel serrations 4 at the opposite sides of each locking lug 2, these serrations having an extent from base to apex of .0225 and an angularity of sixty degrees, and of six serrations 7 on the bases of the recesses 3, these serrations having lengthwise concave curvature conforming to the curvature of the bases of the recesses 3, an extent measured from base to apex of .22, a mutual spacing of one-thirty-second of an inch, and an angularity of sixty degrees.

As above pointed out the bottom face 6 is of shallow angularity, the degree of which may, of course, be varied within practical limits. I have found an angularity of the order of 164 degrees to be highly satisfactory for the purposes in view, that is to say to permit the flattening of the bottom or inner wedge face of the key and at the same time to enhance the increase of the lateral dimensions of the portion adjoining the flat face of the underlying key whereby to enhance the compression effects of both keys (as developed by the blows of the hammering device) upon the adjacent wall portions of the recess R.

The serrations, in addition to their interlocking function above explained, also are of advantage in increasing the extent of the compression areas; and a further increase is gained by the increased extent, as compared with the prior art keys, of the bases of the recesses 3 due to their concave curvature. The increase of the extent of the compression areas thus provided for is sufficient to increase the strength of the casting in the portions adjacent the walls of the recesses R in sensible degree. The gain in the degree of compression in pounds per square inch is due in some extent to the serrations but primarily to the shallowly angular inner or bottom face 6 which, as above explained, effects, when the key is compressed under the continued blows of the hammering device, an additional increase in the lateral dimensions of the adjoining portions of adjoining keys. While I have shown the shallowly angular face 6 as the inner or bottom face of the key and while this arrangement is preferred, it will, of course, be understood that the shallowly angular face may be the upper or outer face of the key.

While the construction of the key according to the details above set forth is preferred it will be obvious that variations or modifications according to any or all features of the invention may be resorted to. Each series of serrations is independently beneficial. This is also true of the shallowly angular face 6 and the arrangement of the serrations of the adjacent series in right angular relation independently of whether the serrations 4 between the upper or outer and bottom or inner faces of the key be arranged on the locking lugs as shown or on the faces of the recesses 3 in which latter case the serrations 7 which extend in the lengthwise direction of the key will be formed upon the locking lugs.

In the following claims words indicative of position, i. e. "inner," "outer" and "side" are used, for brevity and convenience, with reference to the positions of use, as shown in the accompanying drawing of the several faces of the key.

I claim:

1. For use in the repair of cracked castings, a key of malleable metal to be fitted in a recess formed in the casting and extending lineally athwart the crack, the key being generally of rectangular cross section and having inner and outer faces and side faces extending between the inner and outer faces, the key being provided along its side faces with locking lugs and with recesses intermediate the lugs, the lugs and recesses extending between the inner and outer faces, and the key being further provided with parallel serrations in alternating series, the serrations of one series extending in a direction normal to the inner and outer faces and the serrations of the other series extending in a direction normal to the serrations of the first series.

2. A key for the repair of cracked castings as set forth in claim 1 wherein the serrations which extend in a direction normal to the inner and outer faces are formed upon the lugs and the serrations of the alternating series are formed upon the bases of the recesses.

3. A key for the repair of cracked castings as set forth in claim 1 wherein the serrations which extend in a direction normal to the inner and outer faces are formed upon the lugs, the serrations of the alternating series are formed upon the bases of the recesses, and the bases of the recesses are of shallow concave curvature in the lineal direction of the key.

OSCAR C. SCARBERRY.

REFERENCES CITED

The following references are of record in the file of this patent:

UNITED STATES PATENTS

| Number | Name | Date |
|---|---|---|
| 1,367,134 | Hachmann | Feb. 1, 1921 |
| 1,538,314 | Dooner | May 19, 1925 |
| 2,121,769 | Statz | June 21, 1938 |
| 2,195,741 | Scott | Apr. 2, 1940 |
| 2,278,334 | Scott | Mar. 31, 1942 |
| 2,377,169 | Mohr | May 29, 1945 |

FOREIGN PATENTS

| Number | Country | Date |
|---|---|---|
| 504,380 | Great Britain | Apr. 24, 1939 |